United States Patent [19]

Jones

[11] 4,436,025

[45] Mar. 13, 1984

[54] SECTIONING DEVICE FOR ROUNDED FOOD ARTICLES

[76] Inventor: Frank W. Jones, P.O. Box 4074, Greenville, Del. 19807

[21] Appl. No.: 481,390

[22] Filed: Apr. 1, 1983

[51] Int. Cl.[3] .................... A47J 17/00

[52] U.S. Cl. .................... 99/538; 83/437; 83/451; 99/537

[58] Field of Search .......... 99/509, 537, 538, 542–545; 83/437, 451, 569; 30/113.1, 114

[56] References Cited

U.S. PATENT DOCUMENTS

| | | | |
|---|---|---|---|
| 3,830,151 | 8/1974 | Gorson | 99/537 |
| 4,095,518 | 6/1978 | Jones | 99/538 |

*Primary Examiner*—Timothy F. Simone
*Attorney, Agent, or Firm*—Charles S. Knothe

[57] ABSTRACT

A rounded food article, such as a tomato or potato, is quickly divided into a number of radial sections by forcing it through a conical cup of radial blades within which it is impaled on a central spike to which the central ends of the blades are joined. The article is forced through the wedge-shaped spaces between the blades by an annular array of fingers depending from a plunger to which a handle is attached. The plunger assembly slides over a pair of vertical guides towards the blade assembly engaged within a recess in the base. The fingers extend completely through the blades when the plunger is fully engaged within the blades. The plunger includes obstructing tabs in the event both vertical rods are not properly engaged in the plunger, such that the plunger is angularly displaced and the fingers strike the base rather than the blades or spike. Four legs give the device a steady foundation and raise the base sufficiently from the table to allow the long food sections to be freely discharged onto it.

11 Claims, 6 Drawing Figures

SECTIONING DEVICE FOR ROUNDED FOOD ARTICLES

BACKGROUND OF THE INVENTION

Various devices have been proposed to section food articles such as tomatoes, lemons, apples and potatoes. The devices described in U.S. Pat. Nos. 3,830,151 and 4,095,518 use annular array of holding or pushing elements which push the food article through an array of blades. If care is not used when the pushing element is assembled, the pushing elements can come in direct contact with the blades, causing permanent damage to the cutting edge of the blades. One object of this invention is to provide a sectioning device for rounded food items in which the blades can not be damaged by the improper assembly of the device. Further, prior devices allowed for possible injury of the operator's fingers by getting them between the pushing element and the cutting blades or base by the operator improperly grasping the pushing element. Another object of this invention is to provide a handle such that the operator can not readily get his fingers between the pushing element and the cutting blades or base. Prior devices allowed for food particles to accumulate at the point of junction of the radial blades and the spike and was difficult for the operator to clean. A further object of this device is to reduce the accumulation of food particles at the point of junction of the blades and the spike and to make the cleaning of food particles at this point easier.

SUMMARY

Rounded food articles are sectioned by a device comprising a base, in which a conical cup of internally sharp radial blades are mounted. The apex of the blades are disposed towards the base and the blades form substantially wedge-shaped spaces. Slide guide means are connected to the base, which engage a plunger having four point slide guide ways located at the outer perimeter in which the slide guides engage. The plunger containing a pistol grip shaped handle which transverses towards the base and returns along the slide guide means. The plunger has slide guide obstructing tabs attached to the outer perimeter of the plunger adjacent on each side of slide guide ways. An annular array of fingers depend from the plunger which freely engage within the wedge-shaped spaces between the radial blades when the plunger is moved towards the blades. The fingers each comprise a linear element having two ends, one end of each of the fingers being attached to the plunger and the other end being free. The fingers are long enough to substantially pass through the blades when the movement of the plunger into engagement with the base is terminated. Stop means are provided on the base and plunger for terminating their engagement with each other. A spike with a point and a stem is centrally mounted at the central junction of the blades to form their apex disposed within the cup. The point of the spike extends upwardly adjacent the entrance to the cup for holding the article aligned for engagement by the plunger and initiates the radial splitting of the article which is continued and completed by the blades. The stem of the spike has a reduced diameter at the junction of the blades and freely terminates a short distance below the cup of blades.

DESCRIPTION OF PREFERRED EMBODIMENT

Figure 1:
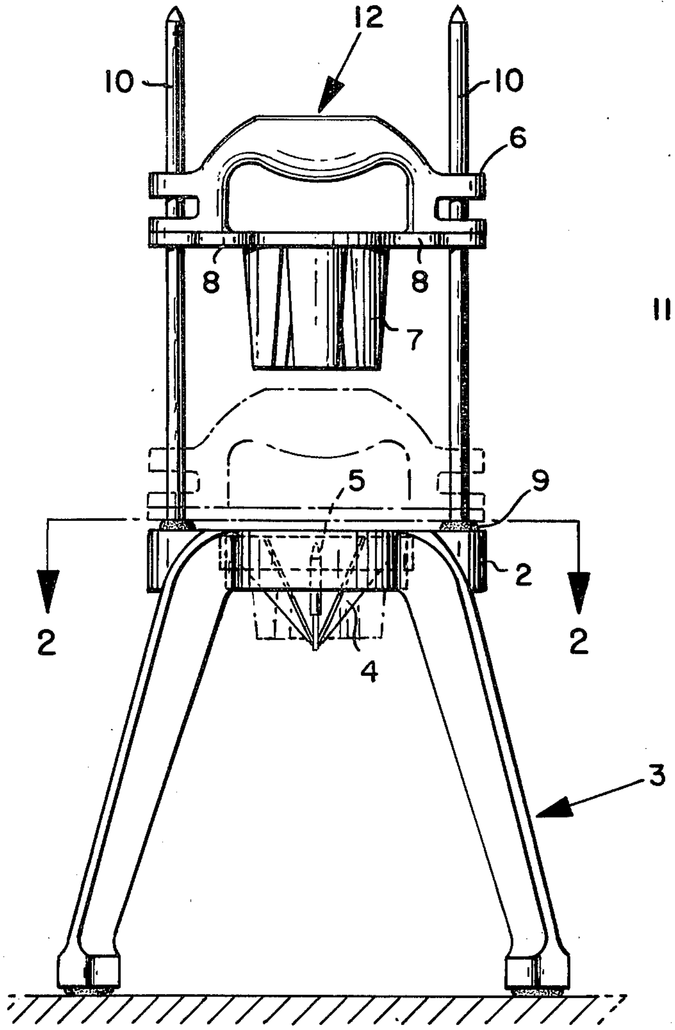
FIG. 1 is a front elevation view of the invention in the open position and closed position in the phantom.

FIG. 1 shows the sectioning device 1 for quickly dividing rounded food articles into a number of wedge-shaped pieces. With the plunger 6 in the up position as shown in FIG. 1, a food article is impaled on spike 5 with one end having a sharp point and the other end attached to the center point of the conically cupped cutting blades 4 which are secured to the base 2. Two slide guides 10 are perpendicularly affixed to the base 2 on opposite sides of the cavity in which the radial blades are located and the slide guides are of sufficient length to allow the entry of even large food items such as a potato. When the plunger 6 is lowered using handle 12 and guided by the slide guides 10 engaged in the slide guide ways 11, the food article is pushed through the blades 4 and cut into wedge shaped pieces. The movement of the plunger 6 along the slide guides 10 is terminated by the slide guide stops 9 which are located at the base 2 end of the slide guides. When the plunger 6 movement is terminated, the fingers 7 have pushed the food article completely past the blades 4 as shown in the phantom drawing of the plunger 6 and fingers 7. The sectioned food pieces fall freely on to the supporting surface between the legs 3 which support the base 2, high enough from the supporting surface to easily remove even long food items.

Figure 3:
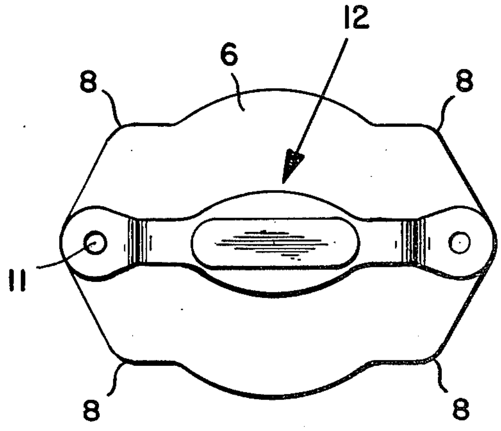
FIG. 3 is a top plan view of the plunger.
Figure 4:
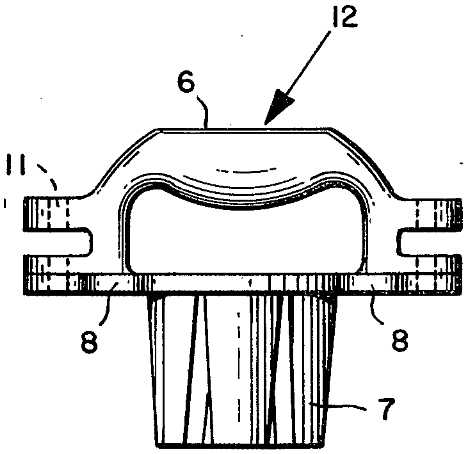
FIG. 4 is a front elevation view of the plunger.
Figure 2:
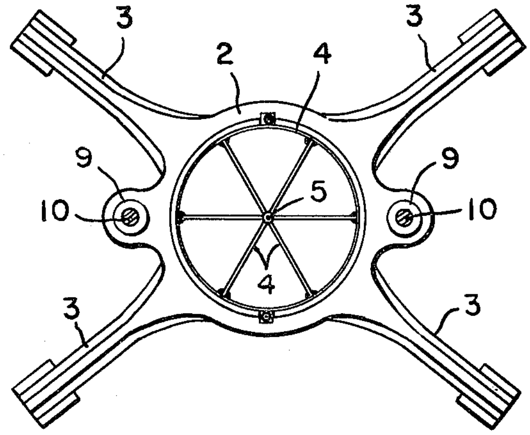
FIG. 2 is a cross-sectional view taken through FIG. 1. along line 2—2.

FIG. 2 shows the base 2 with the spike centrally mounted within the radial blades 4. The blades 4 are removable from the base 2 to facilitate cleaning and replacing when dull. Four legs 3 give the base 2 a steady foundation. Also, shown are the slide guide stops 9 concentrically mounted around the slide guides 10. Plunger 6 with pistol shaped handle 12 which allows the fingers of the hand to comfortably rap around it is shown in FIG. 3 and FIG. 4. The distance from the handle 12 to the plunger 6 is greater than the length of a normal operator's fingers such that it is difficult for the operator to get his finger pinched or cut. FIG. 3 shows the four slide guide obstructing tabs 8 and FIG. 4 shows the fingers 7. FIG. 4 also shows the four point slide guide ways. The separation of two slide guide ways on each slide guide makes for easy transversing of the plunger without jamming of the plunger along the slide guides.

Figure 5:
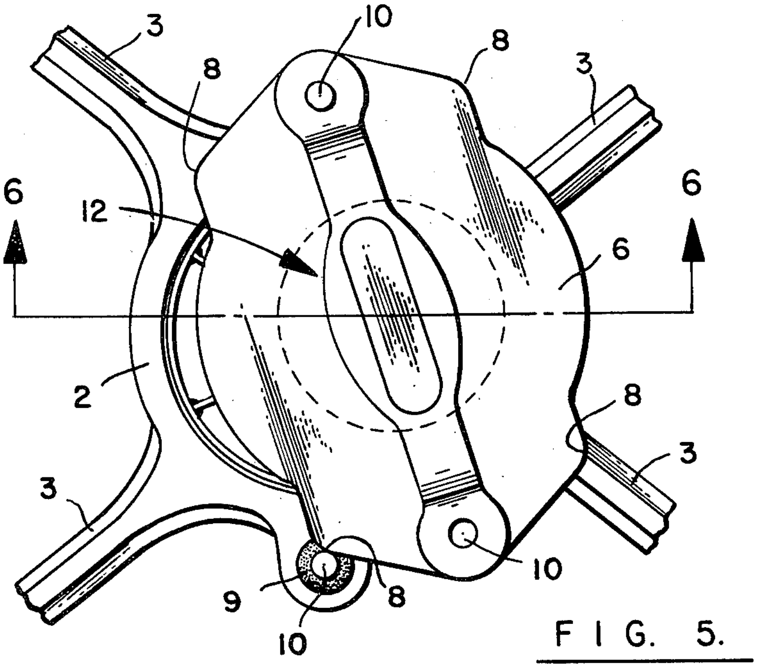
FIG. 5 is a top plan view of the invention with the plunger improperly installed with only one guide rod inserted in the plunger.

In FIG. 5 the plunger 6 is improperly installed such that only one slide guide 10 is engaged within slide guide ways 11. The obstructing tab 8 adjacent to the non-engaged slide guide way 11 is in contact with the slide guide 10 and has caused an angular rotation of the plunger 6 in relation to base 2.

Figure 6:
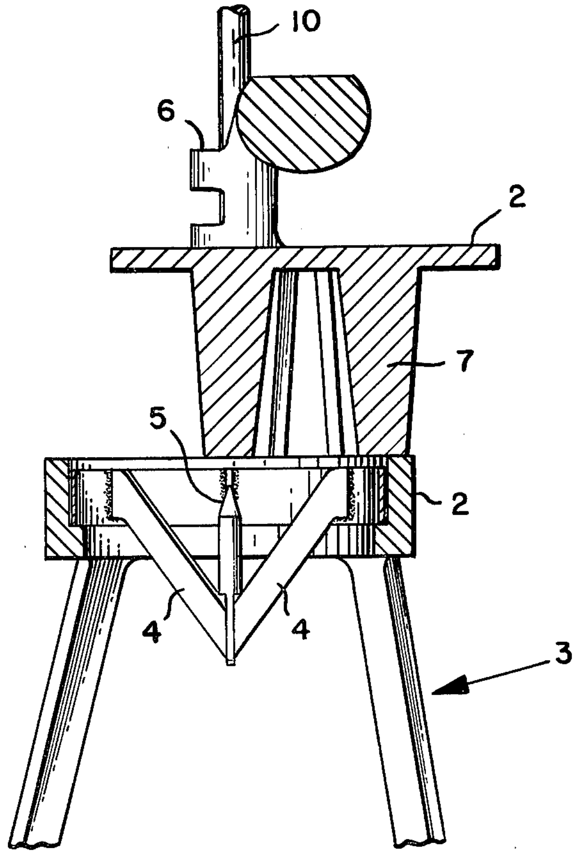
FIG. 6 is a cross-sectional view taken through FIG. 5 along line 6—6 showing the plunger improperly installed and the fingers striking the base.

FIG. 6 shows finger 7 is in contact with the base 2. This contact between finger 7 and the base 2 is caused by the obstructing tabs forcing the angular rotation of the plunger 6 when both slide guides are not properly engaged within the slide guide ways in the plunger. The contacting of the finger 7 with the base 2 stops the fingers 7 from striking the blades 4 or spike 5 which could be damaged if struck by the fingers. Also FIG. 6 shows the reduction on the diamter of the spike 5 at the central junction of the blades 4.

I claim:

1. A device for sectioning a rounded food article comprising a base a conical cup of internally sharp radial blades mounted in the base and having an apex disposed towards the base with substantially wedge-shaped spaces between the blades, slide guide means connected to the base, a plunger having an outer perimeter having slide guide ways located at the outer perimeter of the plunger in which the slide guides engage, the plunger transversing towards the base and returning along the slide guide means, the plunger having slide guide obstructing tabs attached to the outer perimeter of the plunger adjacent on each side of the slide guide ways causing the plunger to rotate when the plunger is installed inproperly without all the slide guide ways cooperating with the slide guides such that the plunger strikes the base rather than said blades;

an annular array of fingers depending from the plunger which freely engage within the wedge-shaped spaces between the radial blades when the plunger is moved towards the blades, the fingers each comprising a linear element having two ends, one end of each of the fingers being attached to the plunger and the other end being free, the fingers being long enough to substantially pass through the blades when the movement of the plunger into engagement with the base is terminated, stop means on the base and plunger for terminating their engagement with each other, a spike having a point and a stem centrally mounted at the central junction of the blades to form their apex disposed within the cup, the point of the spike extending upwardly adjacent the entrance to the cup for holding the article aligned for engagement by the plunger and for initiating the radial splitting of the article which is continued and completed by the blades, the stem of the spike freely terminating a short distance below the cup of blades.

2. A device as set forth in claim 1 wherein the base has four legs with a range of heights from 7 to 9 inches.

3. A device as set forth in claim 1 wherein the plunger has a handle parallel to the top surface of the plunger and 2 and 3 inches from the surface top of the plunger.

4. A device as set forth in claim 1 wherein there are six wedged-shaped spaces between the radially mounted blades.

5. A device as set forth in claim 1 wherein there are eight wedged-shaped spaces between the radially mounted blades.

6. A device as set forth in claim 1 wherein the diameter of the radially sharp blades is between 3 and 4 inches.

7. A device as set forth in claim 1 wherein the included angle of the conical cup of blades is between 75 and 105 degrees.

8. A device as set forth in claim 1 wherein the slide guides consist of two rods of diameter ranging from $\frac{1}{4}$ to $\frac{1}{2}$ inch.

9. A device as set forth in claim 1 wherein the plunger contains four slide guide ways; two on each side separated by a $\frac{1}{4}$ to $\frac{3}{4}$ of an inch.

10. A device as set forth in claim 1 wherein the length of the fingers connected to the plunger are 2 to $2\frac{3}{4}$ inches long.

11. A device as set forth in claim 1 wherein the length of the slide guides is in the range of 8 to 10 inches.

* * * * *